T. E. BROWN.
DRAWBRIDGE.
APPLICATION FILED NOV. 9, 1916.
1,270,925.
Patented July 2, 1918.
3 SHEETS—SHEET 1.
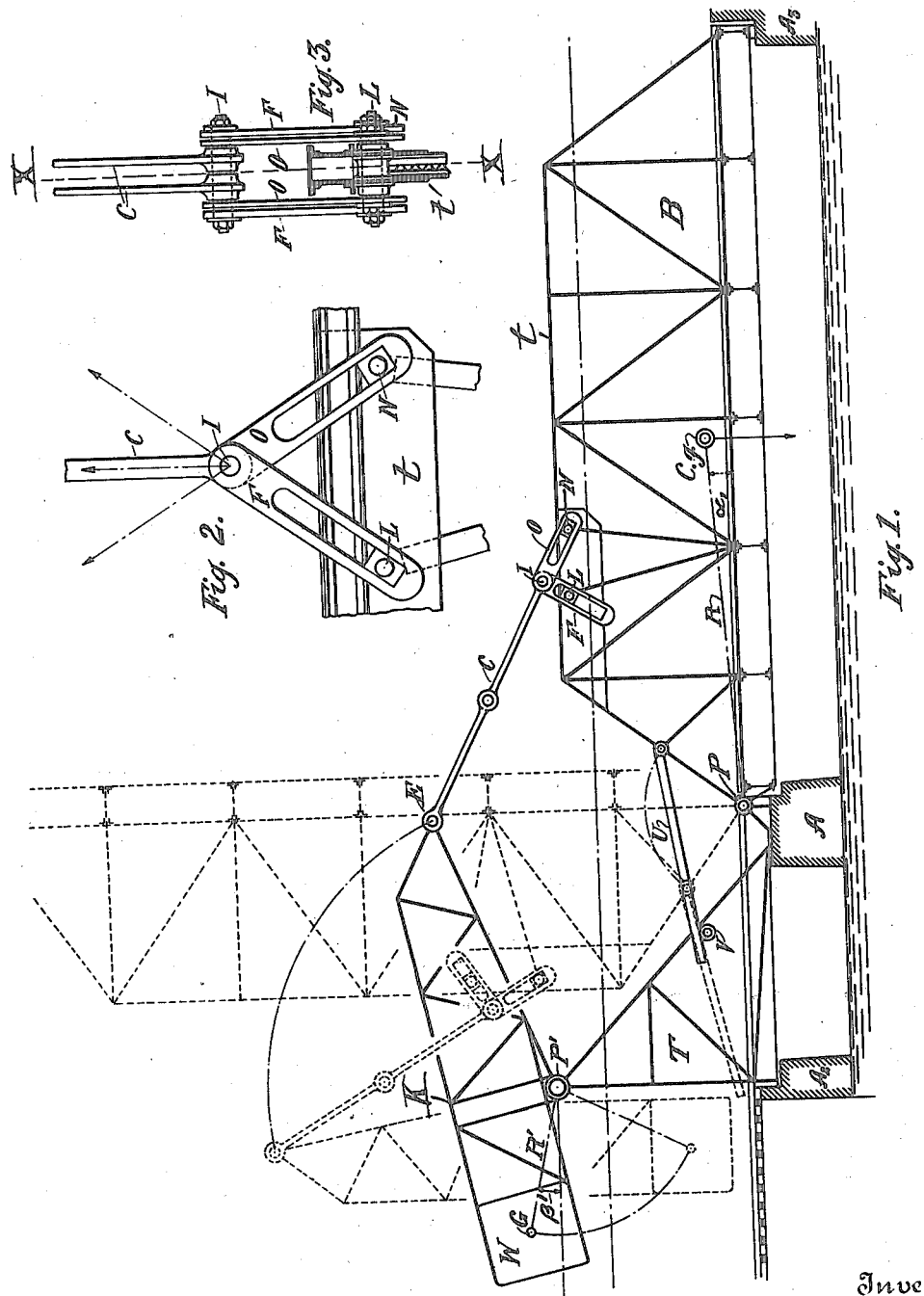
Inventor
Thomas E. Brown
By ........... Attorney

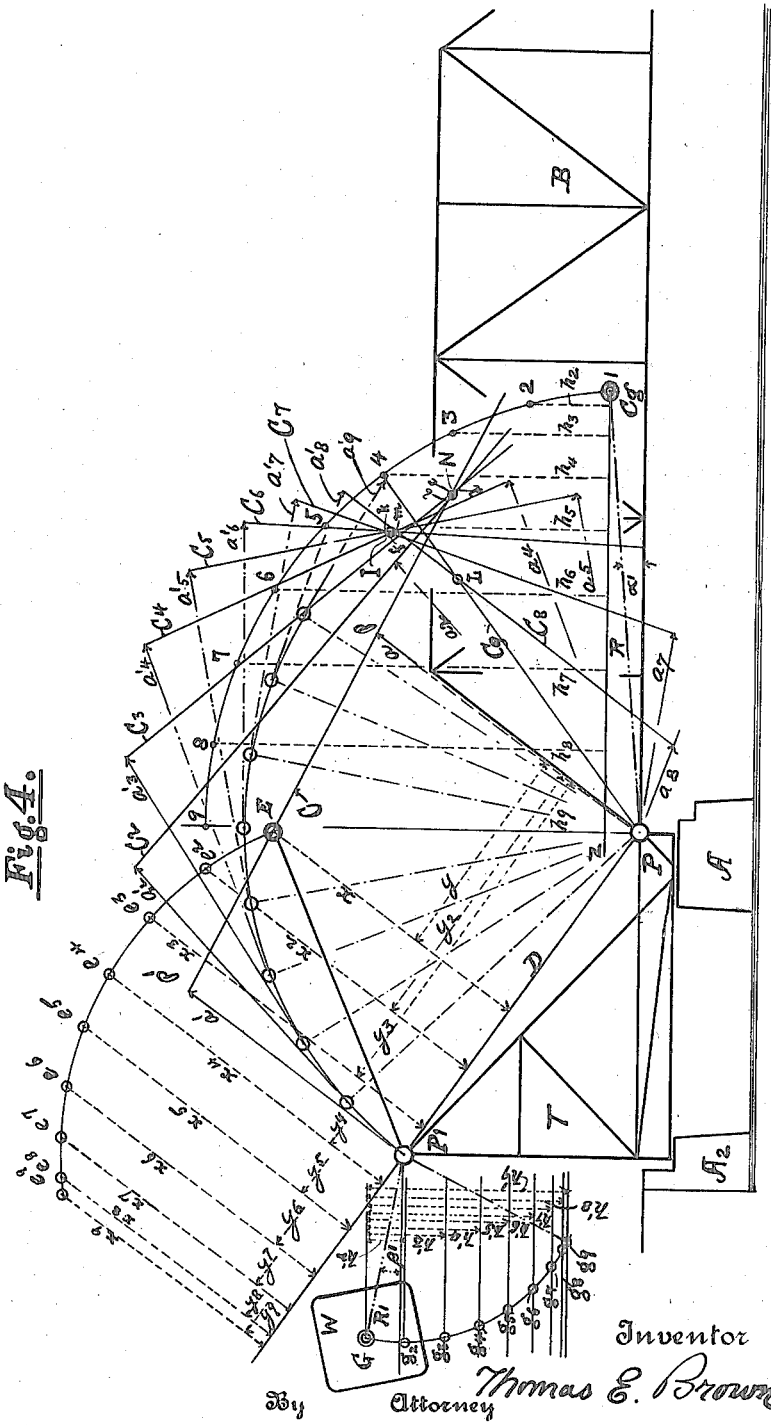

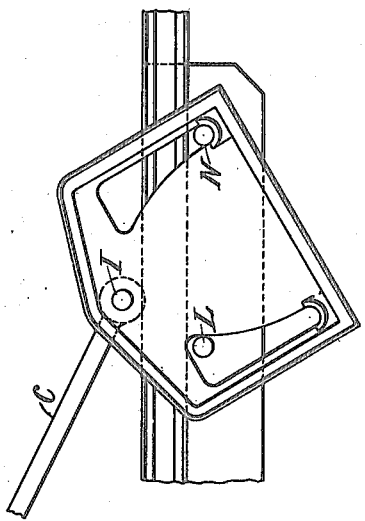
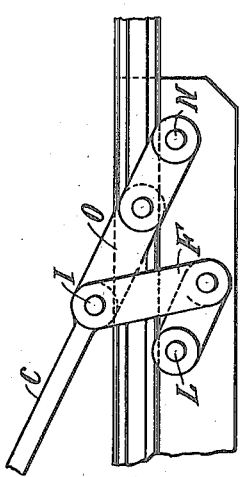
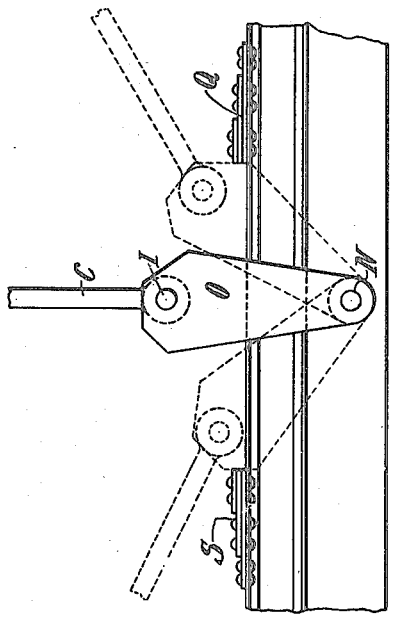

UNITED STATES PATENT OFFICE.

THOMAS E. BROWN, OF NEW YORK, N. Y.

DRAWBRIDGE.

1,270,925.  Specification of Letters Patent.  Patented July 2, 1918.

Application filed November 9, 1916. Serial No. 130,364.

*To all whom it may concern:*

Be it known that I, THOMAS E. BROWN, a citizen of the United States, and a resident of the borough of Manhattan, in the county of New York and State of New York, have invented certain new and useful Improvements in Drawbridges, of which the following is a specification.

This invention relates to improvements in that type of bascule bridge which has been known since very ancient times as the "drawbridge".

Such bridges consist essentially of a pivoted moving span or leaf with balancing beams pivotally supported above the bridge and connected at their outer ends to the moving leaf by tensional connections, balance being effected by heavy weights attached to the inner ends of said beams.

Up to the present time it has been considered essential, in order that the bridge shall be balanced in all its positions that the moment of the weights around their pivot should equal the moment of the bridge or moving leaf around its pivot in every position and consequently that the angular motions of the weights and bridge should be alike and therefore that the counterweight connection should be always parallel to the line joining the pivot of the balancing beams and the pivot of the bridge, and that the line from the pivot of the beams to the center of gravity, or center of attachment of the weights, should be always parallel to the line joining the pivot of the moving leaf and the center of gravity of the leaf, during the entire movement of the bridge.

To meet these supposed essentials, involves the construction of high frames or towers for the support of the balancing beams, as in order to meet the requirements of parallelism described, it is generally necessary that the pivot or fulcrum of the balancing beams be placed at a higher elevation than the center of gravity or point of connection of the counterweight when said counterweight is in its highest position; and also, when, as is usually necessary, the bridge or moving leaf must move to a high angular elevation, approximating 90°, the frames must be spread apart or otherwise arranged to enable the descending counterweight to pass between them.

These requirements involve great expense and inconvenience in construction and the principal objects of my invention are to so arrange the balancing devices that I may balance the bridge in all its positions and at the same time be able to raise the center of gravity of the counterweight to a higher position than the pivot of the balancing beams, and avoid the necessity of the counterweight passing between the supporting frames and in general avoid the limitations of parallelism entirely.

I have discovered that by the use of a tensional counterweight connection and a simple system of linkages, I can accomplish the above described objects and thereby am enabled to use frames or towers of reasonable height and simple construction and am enabled to place the weights, towers, trunnions and counterweight connections all in the planes of the trusses and thereby avoid transverse transference of loads and reactions and am enabled to omit the extra materials usually needed therefor.

Figure 1 is a side elevation of a bridge of my construction.

Fig. 2 shows the linkage system on a larger scale.

Fig. 3 is an end view of Fig. 2.

Fig. 4 is a diagram showing my method of locating the points of rotation of the linkage system.

Figs. 5, 6, and 7 show various modifications of linkages to suit various conditions.

Similar letters of reference refer to similar parts in all the figures.

Referring to Fig. 1, B is a bascule bridge, *t* a truss of said bridge and P the pivot or trunnion about which the moving leaf rotates. A, A2, A3, are piers supporting said bridge and the frame or tower T which supports the trunnion P of a counterweight carrying member or balancing beam K. On the inner end of the balancing beam K and carried by said beam, is the counterweight W and at the outer end of said beam K is a pivot E to which the end of the tensional connection C is attached. Said tensional connection C is attached to the pivot I of the links F and O which in turn are connected to the truss $t$ of the moving leaf by the pins L and N.

The arrangement of said links F and O is such as to cause the said weight W to move in a manner to balance said bridge B in all its positions as will be hereinafter explained. The point C. g. is the center of gravity of the bridge or moving leaf B and the point G is the center of gravity of the weight W. R is the radius from the pivot P of the bridge to the center of gravity C. g. and R1 is the radius from the pivot P1 of the weight to the center of gravity G of the weight, and $\alpha_1$, and $\beta_1$ are the angles which said radii R and R1 make with the horizontal in the primary or lowered position of the bridge B.

The dotted lines show the bridge in its raised position.

It will be understood that the description refers to one side of the bridge only and that the parts described will in general be duplicated on the other side of the bridge, but the counterweight W may extend clear across the bridge if desired, though I prefer to use separate counterweights, each having its center of gravity lying in the plane of its respective truss, i. e. the longitudinal plane of symmetry of said truss.

The tensional connection C may be in one length and of any suitable construction but I prefer to make it of long links or eye bars as indicated in the drawings, with its parts symmetrically disposed with reference to the plane X—X of the truss $t$ as shown in Fig. 3.

It will be noted that the angles $\alpha_1$ and $\beta_1$ are different and that the radius R is not parallel to the radius R1, and that therefore the angular motion of the bridge and the angular motion of the counterweight are not alike and therefore the tensional connection C, as the bridge rises must change its point of rotation in order to balance the bridge in every position, thus, at the beginning of motion, the rotation of C is about pivot N and this continues until the slotted link F engages the pin L, when rotation commences about pivot I and continues until the connection C is in line with said pivot L when rotation commences around said pivot L, the slotted link O moving out of engagement with pivot N, and so continues until the end of the motion. Fig. 2 shows the position of the links when rotation is about the pivot I.

Various modifications of said linkage system are required to suit various relative positions of the points I, L and N which positions are dependent on the position chosen for the point of connection E on the balancing beam. Some of these modifications will be described hereinafter.

A mathematically accurate balance of the bridge B requires a large number of points of rotation, but I find that three points as shown in Fig. 1 will produce a balance sufficiently accurate for all practical purposes, and under some conditions, two points of rotation will suffice.

A most important part of my invention is the method I use to determine the positions of the points of rotation I, L, N of the linkage system.

The proper location of the points of rotation I, L, N of the tensional connection C can best be found by a combination of analytical and graphic methods and I prefer to proceed as follows:

I prepare a diagram, see Fig. 4, on a reasonably large scale for accuracy of the graphic processes. From the pivot P as a center, I draw an arc 1, 2, 3, 4 through the center of gravity C. g. until said arc intersects the vertical through P, and further if the bridge is to move so far, I divide said arc into a convenient number of preferably, but not necessarily equal parts, and preferably including the point 9, vertically over the pivot P. I then draw a horizontal line C. g.—Z, through the center of gravity C. g. and let fall on said horizontal line verticals $h2$, $h3$, $h4$, etc., from the division points, 2, 3, 4, . . . 9, etc., of said arc. These vertical lines represent the various heights to which said C. g. of the bridge is successively raised in its motion around its pivot P, and said heights multiplied by the weight of the bridge represent the work done in raising the bridge to said various heights. By the principle of virtual work the counterweight, in order to balance the bridge in all its positions, must for each of said motions fall a proportionate height, i. e. the algebraic sum of the work of the bridge and the work of the weight must equal zero, or if we represent the ratio of the weight of the counterweight to the weight of the bridge by $n$ and the vertical height the bridge rises for any position by $h$ and the corresponding vertical movement of the counterweight by $h'$, then $$nh' + h = 0$$

or $$h' = -\frac{h}{n}$$

I prefer to make the ratio $n$ from 1.5 to 2 according to the conditions of the design.

By this equation we obtain the vertical distances the weight W must fall corresponding to the various vertical rises of the center of gravity C. g. of the bridge in order to balance the bridge.

I then lay off vertically below the center of gravity G of the weight W these various distances $h'2$, $h'3$, $h'4$, etc., and draw horizontal lines through them, and from the pivot P1 as a center, draw an arc through the center G intersecting said horizontal lines, and the points of intersection, G, $g2$, $g3$, $g4$, $g5$, etc., with said horizontal lines will be the required positions of said center of gravity G, corresponding with positions, 1, 2, 3, ... 9, etc., of the center of gravity C. g. of the bridge, in order to balance the bridge.

Having chosen a suitable position on the balancing beam K for the point of attachment E of the connecting link C, I draw an arc from P1 as a center through E and lay off on said arc the various positions of E, viz: E, $e2$, $e3$, $e4$, etc., corresponding to the positions G, $g2$, $g3$, etc., of the weight and corresponding to positions 1, 2, 3, etc., of the bridge. I then proceed to lay out lines representing the required positions of the connecting link C, relatively to the bridge itself, the bridge being considered fixed in position for the corresponding positions of the bridge, which can best be done in the following manner: Draw a line D through the pivots P and P1, and of indefinite length. Let fall on said line D a perpendicular from each of the points E, $e1$, $e2$, $e3$, etc. Measure the length of said lines and let these lengths be designed as $x$, $x2$, $x3$, $x4$, etc. Measure from point P along line D to the foot of each of said perpendiculars and call said distances $y$, $y2$, $y3$, $y4$, etc.

Draw through P a line P—$p$ perpendicular to D and of indefinite length and also a similar perpendicular through P1.

Then the distances $a$ from the pivot P to the intersection of the line of the connecting link $c$ with the said line P—$p$ perpendicular to D at P and $a'$ from P1 to the intersection of the line of the link C with the line P1—$p'$, for any position of the bridge are given by the following equations:

$$a = \frac{Dx}{\frac{M'}{M}y + D - y}$$

$$a' = \frac{M'}{M}a$$

in which; D is the length of line D from P to P1.

M represents the moment of the bridge around its pivot P, and M1, the moment of the weight around its pivot P1, for the position of the bridge in question and $x$ and $y$ are the distances before described for the same position.

I then rotate the pivot P1 around the pivot P through angular distances equal to the corresponding angular motions of the bridge but in the reverse direction and so obtain the relative positions of said pivot P1 and the line D corresponding to the various positions of the bridge and with relation to the bridge itself, considered as being fixed in position.

I then draw perpendiculars to the line D at the points P and P1, for each of the rotated positions of said line D and pivot P1, and on said perpendiculars I lay off the corresponding distances $a$ and $a'$ respectively, said distances $a$ and $a'$ being obtained by the above formulæ, and through the points thus obtained on said perpendiculars I draw the lines C, C2, C3, C4, etc., and these are the positions relatively to the bridge itself, that the tensional connection C must have to balance the bridge in its corresponding positions.

It will be seen that these lines intersect each other on or near the bridge truss and that by selecting the points averaging these intersections suitable points of rotation for the linkage system may be found.

The lines C, C2 and C3 intersect forming a small triangle $b$, $c$, $d$, and the center of this triangle or point N is a suitable point for a pivot for positions 1 to 3 of the connection C. Similarly the center of the small triangle $f$, $k$, $m$, or point I, is a suitable point for positions 4 to 8, and point L at the intersection of 8 and 9 is a suitable point for said positions.

It will be evident that to produce a mathematically correct balance of the bridge in all its positions, a great number of points of rotation would be required, but the three points shown involve but a trifling error, and give a degree of balance closer than needed in actual practice. If a closer balance is desired more points of rotation may be used.

The form of linkages shown may be varied to suit the particular designer: thus, instead of the slotted links F and O, jointed links may be used, arranged to fold up as shown on Fig. 5, or a slotted plate as shown in Fig. 6 may be used.

The positions of the points of rotation depend on the angle through which the counterweight W moves and the position chosen for the point E. In some cases the linkage system will require short rotation lengths of C at the beginning and end of the motion and a longer rotation length in the middle of the motion, a reverse of the case here shown. In such cases two pivots I and N may be used, arranged with stops S and Q for one of them as shown in Fig. 7.

It should be noted that the connection C is always in tension even when the center of gravity of the bridge reaches or passes an angular elevation of 90°.

The bridge may be operated in any suitable manner as by the operating strut U and pinion V commonly used in the art.

Now having described my improvements, what I claim as my invention is:

1. In a drawbridge, the combination of a hinged span, a counterweight, a balancing beam carrying said counterweight, a support for said beam, a tensional connection from said beam to said span, and pivoted links joining said connection to said span, said links being so pivoted that said span is balanced throughout its motion.

2. In a drawbridge, the combination of a hinged span, a counterweight, a balancing beam carrying said counterweight, a support for said beam, a tensional connection from said beam to said span, and means to vary the point of rotation of said connection relatively to said span to balance said span in all its positions.

3. In a drawbridge, the combination of a hinged span, a counterweight, a pivoted beam carrying said counterweight, a support for said beam, a tensional connection from said base to said span, said tensional connection being at an angle with the line joining the hinge of said span and the pivot of said beam when said span is in its lowered and raised positions and means to balance said span in all its positions.

4. In a drawbridge, a hinged span, a counterweight, a balancing beam carrying said counterweight and constraining said counterweight to move in a curved path, a tower supporting said beam, a connection from said beam to said span and means to change the point of rotation of said connection on said span as said span moves to its various positions.

5. In a drawbridge, a hinged span, a counterweight, a beam carrying said counterweight, a frame supporting said beam, a tensional connection from said beam to said span, and pivoted attachments for said connection to change the point of rotation of said connection as said span moves to its various positions.

6. In a drawbridge, a hinged span, a counterweight, a pivoted beam supporting said counterweight and constraining said counterweight to move in an arc of a circle, a tensional connection from said beam to said span and pivoted attachments from said connection to said span to change the point of rotation of said connection and make the vertical movements of the center of gravity of said counterweight proportional to the vertical movements of the center of gravity of said span as said span moves to its various positions.

7. In a drawbridge, a hinged span, a counterweight having angular motion differing from the angular motion of said span, a pivoted beam supporting said counterweight, a tower supporting said beam, a tensional connection from said beam to said span, links joining said connection to said span and multiple pivots for said links so that the vertical movement of the center of gravity of said counterweight is always proportional to the vertical movement of the center of gravity of said span.

8. In a drawbridge, a hinged span, a counterweight adapted to move in a path of different angularity from that of the path of the center of gravity of said span, a pivoted beam supporting said counterweight, a tensional connection from said beam to said span, attachments joining said connection to said span and multiple pivots for said attachments so that the virtual work of said weight equals the virtual work of said span in all its positions.

9. A drawbridge comprising a moving leaf mounted upon horizontal pivots at its heel, a counterweight carrying part mounted on fixed horizontal pivots behind the leaf pivots, the two sets of pivots separately supported, a tensional member connecting the moving leaf and said counterweight carrying part, and multiple pivots, joining said tensional member to said leaf, to change the point of rotation of said tensional member relatively to said leaf, the vertical line through the center of gravity of the counterweight and the line passing through the axis of said tensional member intersecting above the trunnions supporting the counterweight carrying part.

10. A drawbridge comprising a moving leaf mounted on horizontal pivots at its heel, a counterweight carrying part mounted on fixed horizontal pivots behind the leaf pivots, two separate supports, one for the leaf and the other for the counterweight carrying part, a flexible link connecting the moving leaf with the counterweight carrying part, and means to vary the point of rotation of said link relatively to said leaf, the vertical line through the center of gravity of the counterweight and the line passing through the axis of the link intersecting above the trunnions on which the counterweight carrying part is supported, and the line joining said point of intersection and the trunnions of the counterweight carrying part passing between said supports in all positions of the leaf.

11. A drawbridge comprising a moving leaf pivotally connected to a support, a separate counterweight carrying part pivotally mounted behind said leaf, a counterweight carried thereby, a flexible link connecting the leaf with the counterweight carrying part and means to vary the lever arm of said link about the pivot of said leaf, the lever arm of the counterweight and the lever arms of the link all being shorter than the lever arm of the moving leaf, and the said lever arms of said link being unequal and variable about the pivot of the bridge and the pivot of the counterweight carrying part.

12. A drawbridge comprising a moving leaf mounted on horizontal pivots at its heel and terminating at said pivots, a counterweight carrying part mounted on fixed horizontal pivots behind the leaf pivots, the two sets of pivots separately supported on fixed supports, a counterweight on said counterweight carrying part, a flexible link connecting the moving leaf and counterweight carrying part and multiple pivots to vary the points of rotation of said link whereby the counterweight and leaf balance each other in all positions, the center of gravity of the counterweight being behind the pivot of the counterweight carrying part when the center of gravity of the leaf is vertically over its pivot.

13. In a drawbridge, the combination of a hinged span, a counterweight, a beam carrying said counterweight and pivotally supported on a frame, a connection from said beam to said span and means to vary the point of rotation of said connection relatively to said span whereby said counterweight balances said span in all its positions and said counterweight being behind said frame when said span is in its vertical position.

14. In a drawbridge, the combination of a hinged span, a counterweight, a balancing beam carrying said counterweight, a frame supporting said beam, a connection from said beam to said span and means to change the point of rotation of said connection on said span as said span moves to its various positions, said connection, said beam, said frame and the center of gravity of said counterweight all lying in the same plane.

15. In a drawbridge, a hinged span having a truss at each side thereof, each truss provided with a counterweight, a beam carrying said counterweight and pivotally supported on a frame, a connection from said beam to said truss, said beam, said frame, said connection and the center of gravity of said counterweight, all lying in the plane of said truss and means to balance said span in all its positions.

16. In a drawbridge, a hinged span having a plurality of trusses, each truss provided with a counterweight, a beam carrying said counter-weight, a frame pivotally supporting said beam and a connection to said beam; each truss and its said counter-weight, beam, frame and connection all having the same plane of symmetry and means to balance said span in all its positions.

Signed at New York city, in the county of New York, and State of New York, this seventh day of November, A. D. 1916.

THOMAS E. BROWN.

Witnesses:
   THOS. E. BROWN, Jr.,
   WM. E. SCULLY.